United States Patent [19]

Hosoi

[11] Patent Number: 4,565,473
[45] Date of Patent: Jan. 21, 1986

[54] DRILL

[76] Inventor: Toshiaki Hosoi, 9-10, Kami-minami 5-chome, Hirano-ku, Osaka, Japan

[21] Appl. No.: 579,289

[22] Filed: Feb. 14, 1984

Related U.S. Application Data

[63] Continuation of Ser. No. 290,130, Aug. 5, 1981, abandoned.

[30] Foreign Application Priority Data

Aug. 29, 1980 [JP] Japan .............................. 55-120463
Oct. 30, 1980 [JP] Japan .............................. 55-153639

[51] Int. Cl.$^4$ .............................................. B23B 51/02
[52] U.S. Cl. ................................. 408/229; 408/224; 408/211
[58] Field of Search ............... 408/199, 211, 223, 224, 408/225, 227, 228, 229, 230, 705

[56] References Cited

U.S. PATENT DOCUMENTS

| | | | |
|---|---|---|---|
| 161,106 | 3/1875 | Farmer | 408/229 |
| 854,144 | 5/1907 | Broadbooks | 408/56 |
| 1,221,247 | 4/1917 | Traylor | 408/224 |
| 2,193,186 | 3/1940 | Bannister | 408/223 |
| 2,237,901 | 4/1941 | Chun | 408/223 |
| 2,294,969 | 9/1942 | Engvall et al. | 408/224 |
| 2,332,295 | 10/1943 | Bouchal | 408/211 |
| 2,360,385 | 10/1944 | Anderson | 408/223 |
| 2,587,980 | 3/1952 | Doepker | 408/211 |
| 2,646,701 | 7/1953 | Letien | 408/223 |
| 2,786,373 | 3/1957 | Patton | 408/224 |
| 3,028,773 | 4/1962 | Borneman | 408/223 |
| 3,452,625 | 7/1969 | Russo | 408/223 |
| 3,592,555 | 7/1971 | Mackey | 408/225 |
| 3,709,628 | 1/1973 | Hibbert et al. | 408/229 |
| 3,997,279 | 12/1976 | Porter | 408/225 |
| 4,090,807 | 5/1978 | Stewart | 408/229 |
| 4,143,723 | 3/1979 | Schmotzer | 408/230 |
| 4,222,690 | 9/1980 | Hosoi | 408/230 |

FOREIGN PATENT DOCUMENTS

| | | | |
|---|---|---|---|
| 1284252 | 11/1968 | Fed. Rep. of Germany | 408/211 |
| 39290 | 3/1979 | Japan | 408/224 |
| 55-90213 | 7/1980 | Japan | 408/227 |
| 364750 | 1/1932 | United Kingdom | 408/211 |
| 147415 | 10/1960 | U.S.S.R. | 408/211 |
| 286458 | 8/1971 | U.S.S.R. | 408/210 |

*Primary Examiner*—Gil Weidenfeld
*Assistant Examiner*—Daniel W. Howell
*Attorney, Agent, or Firm*—Jordan and Hamburg

[57] ABSTRACT

A drill formed with chip discharging flutes in its shank and having a flute width ratio of 0.5 to 0.02 to give increased torsional rigidity to the drill shank, the drill being adapted to form holes, especially deep holes, with an improved cutting efficiency.

12 Claims, 11 Drawing Figures

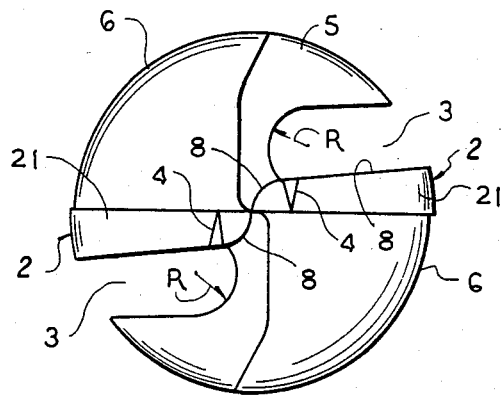
FIG. 2
FIG. 3
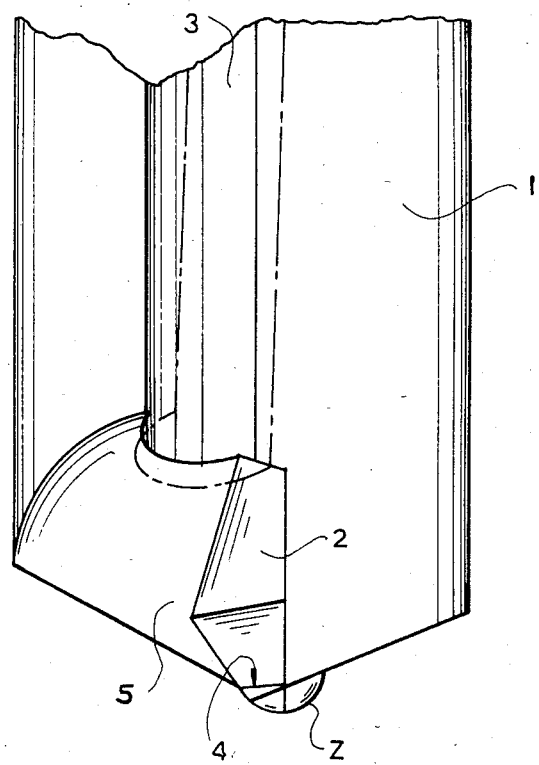

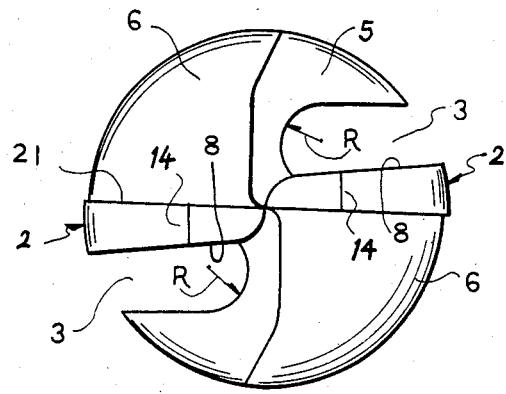
FIG. 7
FIG. 8
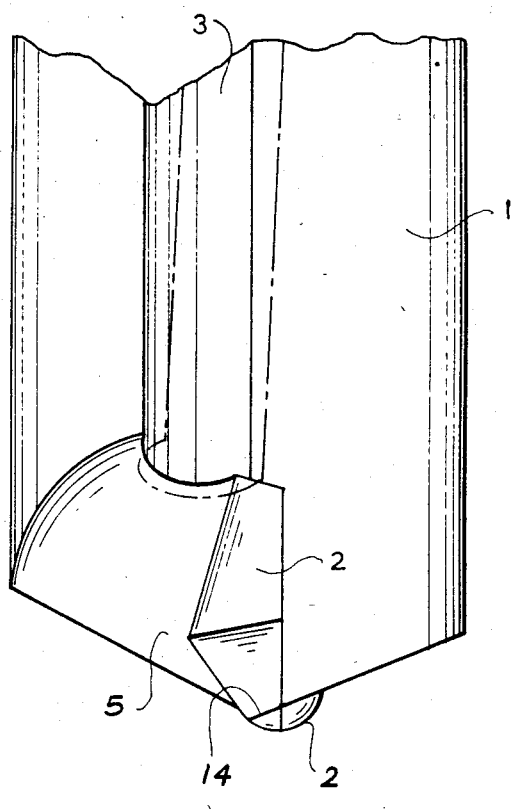

1

DRILL

This is a continuation of application Ser. No. 290,130, filed Aug. 5, 1981, now abandoned.

BACKGROUND OF THE INVENTION

The present invention relates to a drill having increased rigidity and adapted to drill holes, especially deep holes, with an improved cutting efficiency.

Conventional drills are formed with helical flutes in the outer periphery of the shank for discharging chips. Such flutes have a width ratio of as large as about 1, so that the shank is low in torsional rigidity and in bending rigidity. Consequently, the drill is unable to cut workpieces efficiently especially for forming deep holes. Further, since the shank has low rigidity, the drill fails to form holes having accurate circularity and defined by a surface of low roughness.

Accordingly, an object of the present invention is to provide a drill including a shank of enhanced rigidity and thereby adapted to exhibit improved cutting performance for drilling holes, especially deep holes.

Another object of the invention is to provide a drill having a shank of increased rigidity and permitting smooth discharge of chips.

Another object of the invention is to provide a drill having cutting edges which form chips of reduced width so that the chips can be discharged with decreased resistance.

Still another object of the invention is to provide a drill having chip discharging flutes which are easy to form, the drill being adapted to produce chips which are broken into pieces of suitable length and rendered easy to handle when discharged.

These and other objects and features of the invention will become more apparent from the following description of embodiments given with reference to the accompanying drawings.

BRIEF DESCRIPTION OF THE DRAWINGS

FIG. 2 is a bottom view of the drill;

FIG. 3 is a right side elevation showing the forward end portion of the drill of FIG. 1;

FIG. 7 is a bottom view of the drill of FIG. 6;

FIG. 8 is a right side elevation showing the forward end portion of the drill of FIG. 6;

DESCRIPTION OF THE PREFERRED EMBODIMENTS

Figure 1:
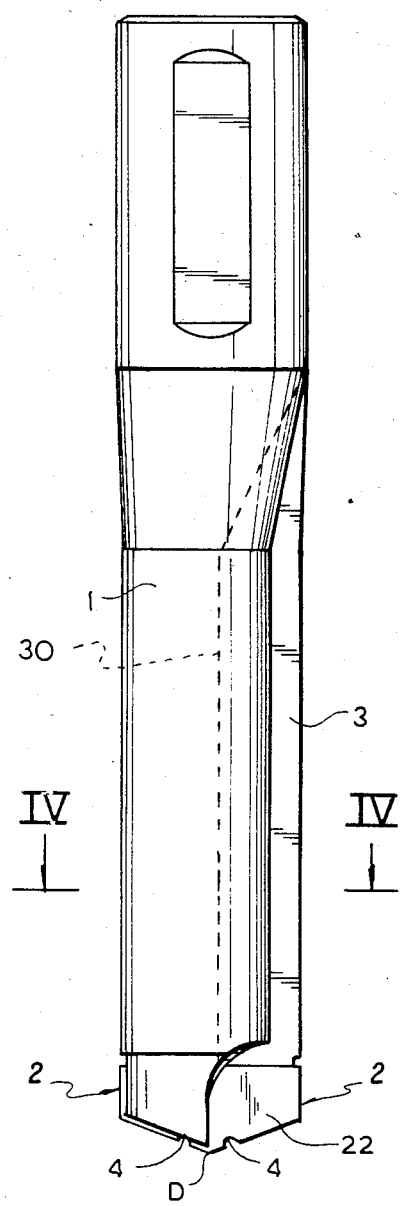
FIG. 1 is a side elevation showing a drill embodying the invention.

With reference to FIGS. 1 to 4, indicated at 1 is the shank of a drill. A pair of tips 2, 2, is attached to the forward end of the shank 1, for example, by brazing. Each of the tips 2 has a cutting edge 8 which is so shaped that when seen in a bottom view, it has a large curvature in the center of the drill and extends approximately straight toward the outer periphery of the drill. A recess 4 along a relief face 21 of the tip 2 is formed in the vicinity of the junction between the curve portion and the straight portion of the cutting edge 8, whereby the cutting edge 8 is divided into the curve portion and the straight portion. The pair of recesses 4, 4 may be positioned on the same circumference or on different circumferences.

While the cutting edge 8 is in the form of a curve of large curvature in the center to assure an improved cutting efficiency, the edge 8 in the outer peripheral portion of the drill may be curved with a small curvature instead of being straight as illustrated. The recess 4 dividing the cutting edge 8 into the central edge portion and the peripheral edge portion may be formed along the rake face 22 of the tip 2.

In the portion of the drill opposed to the cutting edge 8 and to the rake face 22, a chip pocket 5 is formed which is continuous with a chip discharging flute 3 formed in the shank 1 axially thereof. At the base end of the shank 1, the flute 3 has a bottom portion 30 of progressively decreasing depth. The chip discharging flutes 3 may be so formed as indicated in phantom lines in FIGS. 3 and 4. A channel extending through the shank 1 may be opened at the top face 6 of the shank 1 for supplying a cooling liquid to the drill end during cutting to prevent removal of the brazed tip due to heat.

Figure 6:
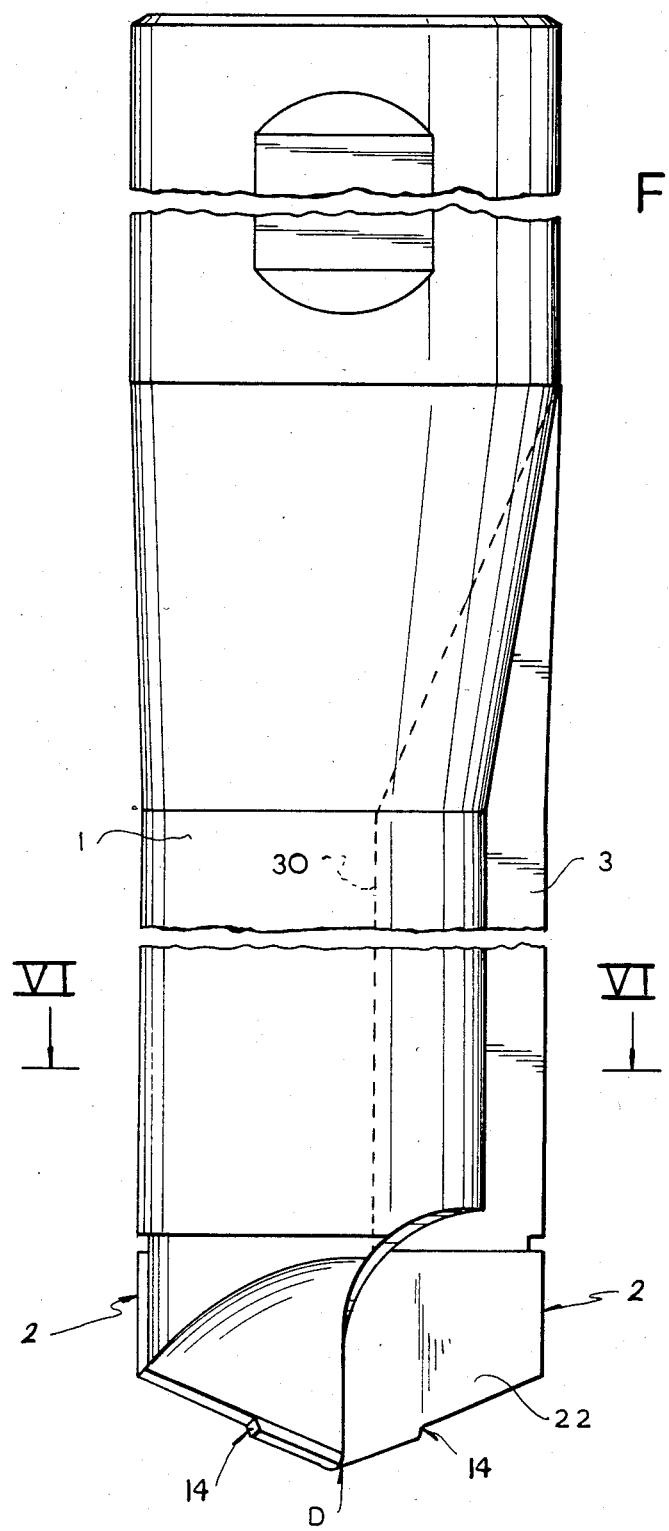
FIG. 6 is a side elevation showing another alternate drill embodying the invention.

FIGS. 6 to 8 show another embodiment which has a pair of cutting edges 8 each including a curved central edge portion and an outer edge portion. A stepped portion 14 is formed between these edge portions to provide a level difference therebetween. The pair of stepped portions 14, 14 may be positioned on the same circumference or on different circumferences. Insofar as the stepped portion 14 is positioned between the axis of the drill and the outer periphery thereof, the stepped portion 14 may be located closer to the axis or to the outer periphery than the illustrated location. Two or more stepped portions 14 may be formed in each of the cutting edges 8.

Figure 9:
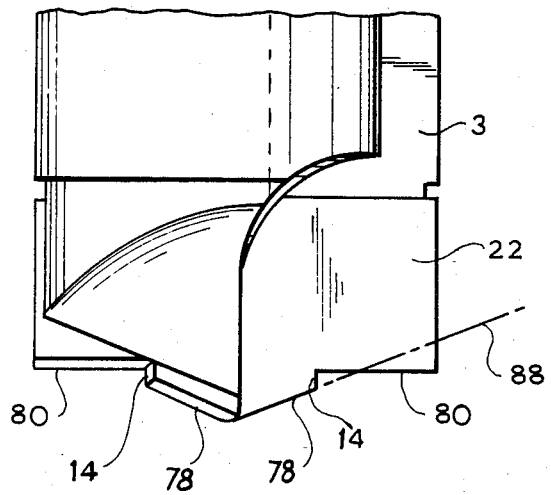
FIG. 9 is a side elevation showing the forward end portion of another alternate drill embodying the invention.
Figure 10:
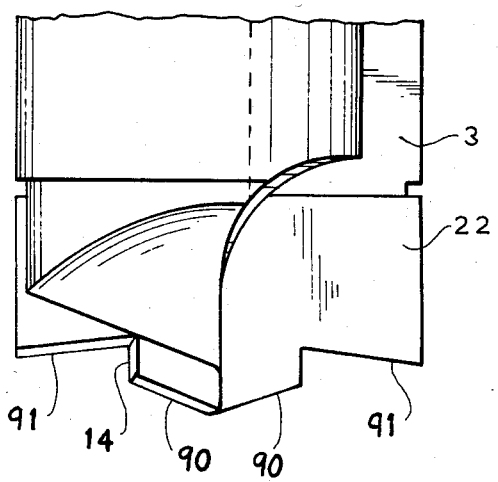
FIG. 10 is a side elevation showing the forward end portion of another alternate drill embodying the invention.

FIG. 9 shows another embodiment wherein each cutting edge includes a central edge portion 78, an outer edge portion 80 and a stepped portion 14 therebetween. The outer edge portion 80 extends at a right angle to the axis of the drill. FIG. 10 shows another embodiment having a central edge portion 90 and an outer edge portion 91 which are inclined in directions opposite to each other. In these illustrated embodiments, the outer edge portions 90, 91 are projected forward beyond a phantom line 88 extending from the central edge portion 90, such that the extension line 88 intersects the edges portions 90, 91. However, the extension line need not always intersect the outer edge portion.

With the embodiments described above, the chip discharging flute 3 has an opening which has a reduced area at the outer periphery of the drill. Whereas the conventional chip discharging flute has a large opening as indicated in phantom lines 9 in FIGS. 4 and 11, the flute 3 of this invention has a narrow outer peripheral portion as indicated in solid lines. Whereas the reduction in the cross sectional area of the shank in the vicinity of its outer periphery due to the provision of the flute greatly influences the torsional rigidity and bending rigidity of the shank, the reduction is smaller when the flute 3 is so shaped as described above, with the result that the shank has greatly improved torsional and bending rigidities. The improvement in torsional and bending rigidities eliminates the axial deflection or vibration of the drill which is encountered markedly with drills having an elongated shank for drilling deep holes. Consequently the drill of this invention forms bores with improved accuracy in respect of circularity and surface smoothness.

Figure 4:
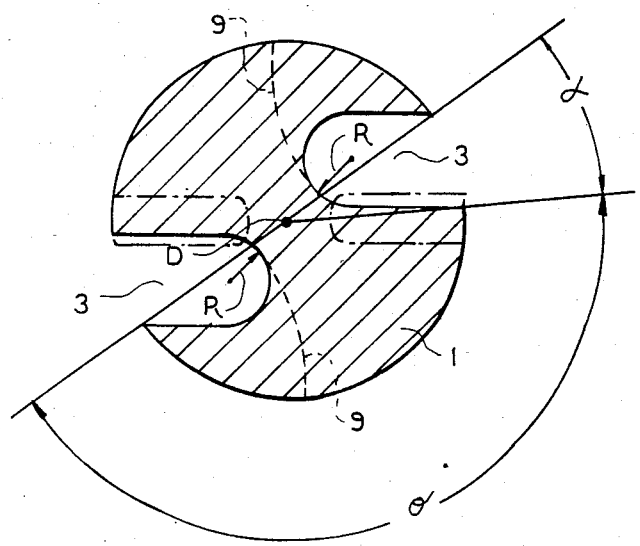
FIG. 4 is a view in section taken along the line IV—IV in FIG. 1.
Figure 11:
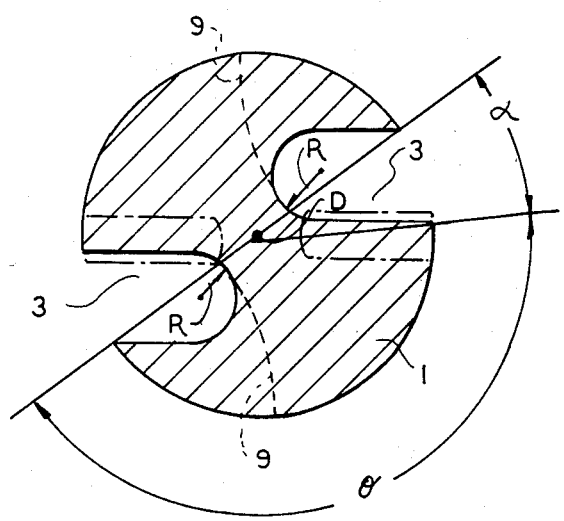
FIG. 11 is a view in section taken along the line VI—VI in FIG. 6.

FIGS. 4 and 11 show an angle α formed between two radial lines extending from the axis of the shank, D, through the opening ends of the flute 3, and an angle θ subtended by the peripheral portion, not fluted, of the shank. The ratio α/θ is defined as "flute width ratio." With conventional drills, this ratio is about 1, whereas the drill of this invention has a flute width ratio of 0.5 to 0.02, preferably 0.4 to 0.05 or more preferably 0.3 to 0.1. The illustrated embodiments are about 0.236 in the α/θ ratio.

When the drill shown in FIGS. 1 to 4 is used for drilling, the central edge portion inside the recess 4 forms a small chip, while the outer edge portion outside the recess 4 forms a straight strip-shaped chip corresponding to the edge portion in width. These chips ascend the flute 3 for discharge. The drills shown in FIGS. 6 to 11 form separate chips by the central edge portion and the outer edge portion individually. The central edge portion forms a compactly curled chip, while the outer edge portion forms a chip having a width corresponding to that of the edge portion and corrected to a straight strip shape for smooth discharge by being prevented from curling in the flute. When the cutting edge is so shaped as shown in FIGS. 6 to 8, the chip formed by the outer edge portion is forced also toward the bottom of the flute 3, whereas when the cutting edge is so shaped as shown in FIG. 9, the chip formed by the outer edge portion 80 is forced out axially of the drill, such that the wall surface defining the flute 3 acts against the chip to a lesser extent, permitting discharge of the chip with improved smoothness. Further in the case of the cutting edge of the shape shown in FIG. 10, the chip formed by the outer edge portion 91 is directed to the periphery of the hole formed, with the resulting advantage that the chip is less likely to interfere with the chip formed by the central edge portion 90.

When conventional drills are used for drilling, the chips formed are continuous and curl along the helical flute of the drill, so that the chips will twine about the drill or a rotating portion of some other machine tool, hence very hazardous.

According to the invention, however, the central edge portion inside the recess 4 or stepped portion 14 forms compactly curled chips, while the outer edge portion outside the recess or stepped portion forms striplike chips having a width corresponding to the width of the edge portion. By being passed through the flute 3, the strip-shaped chips are prevented from curling, straightened and thereby made easily breakable. Accordingly the chips are discharged very smoothly.

Because the central edge portion forms very small chips and further because the outer edge portion forms straight strip-shaped chips, the flute 3 assures smooth discharge of the chips even when having a small width.

When the chip discharging flute 3 is formed straight axially of the shank as illustrated, the chips passing through the flute during drilling will be broken into suitable pieces by the rotation of the drill. The straight flute can be formed at an exceedingly lower cost than conventional flutes and is therefore especially preferable. For drilling, the drill is rotated, or the workpiece is rotated.

The chip discharging flute may alternatively be formed helically along the shank. Two or more recesses 4 may be formed in each cutting edge for producing chips of further reduced width. No recess 4 may be formed when the flute has a large cross sectional area.

Figure 5:
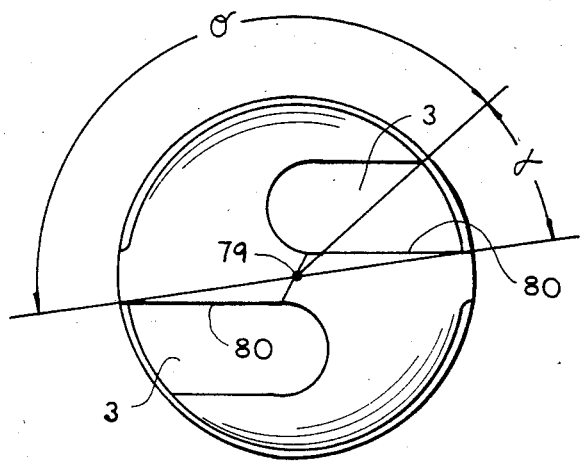
FIG. 5 is a bottom view showing another alternate drill embodying the invention.

Although the pair of cutting edges 8 in the foregoing embodiments are continuous at the center D, the edges may be spaced apart from each other by about 0.5 to 1 mm at the center D. Provided that the cutting edges 8 are curved with a large curvature in the vicinity of the center D, the edges need not always be formed symmetrically. One of the cuttings edges may be adapted to serve as an auxiliary cutting edge. As seen in FIG. 5, straight cutting edges 80 are usable, in which case also the flute width ratio should be in the range specified above. Indicated at 79 in FIG. 5 is a chisel.

The cutting edges 8, 91 may be formed directly on the shank, or on tips attached to the shank, for example, by brazing. The material for the chip or shank is not particularly limited; cemented carbide alloys, high-speed steels, alloy steels, etc. are usable. While it is characteristic of the present invention that the chip discharging flute is formed in the shank axially thereof or helically with a smaller flute width ratio than conventional flutes, the flute need not have a uniform cross sectional shape axially of the shank. The flute width ratio and the cross sectional area of the flute are variable as desired axially of the shank.

What is claimed is:

1. A drill of enhanced torsional rigidity for drilling deep holes comprising a shank having discharging flutes, a pair of cutting edges each of said cutting edges having an arcuate central edge portion and a generally straight outer edge portion, a stepped portion between said arcuate central edge portion and said straight outer edge portion, said arcuate central edge portion being longitudinally spaced from said straight outer edge portion, said stepped portion constituting a generally longitudinally disposed surface, said arcuate central edge portion being constructed and arranged with an arcuate configuration so as to form compact and relatively small curled inner chips, said straight outer edge portion being constructed and arranged with a generally straight configuration so as to form generally straight, strip-shaped outer chips separated from said inner chips and having a width corresponding to the width of said straight outer edge portion, said flutes having a flute width ratio which is within the range of 0.5 to 0.02 such that said strip-shaped outer chips are prevented from curling by the inside walls of said flutes, whereby the formation of said uncurled outer chips enables smooth discharge of said outer chips along with said compact and curled inner chips through said flutes.

2. A drill according to claim 1, wherein said flute width ratio is within the range of 0.3 to 0.1.

3. A drill according to claim 1, wherein said cutting edges are formed on a cutter tip attached to said shank.

4. A drill according to claim 1, wherein said flutes extend generally axially of said shank.

5. A drill according to claim 1, wherein said central edge portion has an included first angle of inclination relative to the axis of said drill, said outer edge portion having an included second angle of inclination relative to the axis of said drill, said first angle being different from said second angle.

6. A drill according to claim 5, wherein said included first angle is an acute angle and said included second angle is about ninety degrees.

7. A drill according to claim 5, wherein said included first angle is an acute angle and said included second angle is an obtuse angle.

8. A drill according to claim 5 wherein an imaginary line forming a continuation of said central edge portion intersects said outer edge portion.

9. A drill according to claim 1, wherein said flutes have a depth less than the radius of said shank such that said depth along with said flute width ratio provide enhanced torsional rigidity of the drill for drilling deep holes.

10. A drill according to claim 1, wherein said flutes have a progressively decreasing depth along the longitudinal length thereof.

11. A drill of enhanced torsional rigidity for drilling deep holes comprising a shank having discharging flutes, a pair of cutting edges, each of said cutting edges having an arcuate central edge portion and a generally straight outer edge portion, a recess between said arcuate central edge portion and said straight outer edge portion, said arcuate central edge portion being longitudinally spaced from said straight outer edge portion, said arcuate central edge portion being constructed and arranged with an arcuate configuration so as to form compact and relatively small curled inner chips, said straight outer edge portion being constructed and arranged with a generally straight configuration so as to form generally straight, strip-shaped outer chips separated from said inner chips and having a width corresponding to the width of said straight outer edge portions, said flutes having a flute width ratio which is within the range of 0.5 to 0.02 such that said strip-shaped outer chips are prevented from curling by the inside walls of said flutes whereby the formation of said uncurled chips enables smooth discharge of said outer chips along with said compact and curled inner chips through said flutes, said flutes having a depth less than the radius of said shank such that said depth along with said flute width ratio provides enhanced torsional rigidity of the drill for drilling deep holes.

12. A drill according to claim 11, wherein said flutes have a progressively decreasing depth along the longitudinal length thereof.

* * * * *